United States Patent Office 3,224,866
Patented Dec. 21, 1965

3,224,866
METHOD FOR CONTROLLING VEGETATION AND SOIL FUNGI
Richard O. Zerbe, Nitro, and John J. D'Amico, Charleston, W. Va., assignors to Monsanto Company, a corporation of Delaware
No Drawing. Original application Oct. 12, 1959, Ser. No. 845,639, now Patent No. 3,152,163, dated Oct. 6, 1964. Divided and this application May 31, 1963, Ser. No. 297,475
5 Claims. (Cl. 71—2.7)

This application is a division of application Serial Number 845,639, filed October 12, 1959, now U.S. Patent No. 3,152,163.

The present invention relates to a new class of dithiocarbamates and to their preparation. More particularly, the present invention relates to 2-chloroallyl dithiocarbamates represented by the following general formula

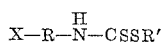

$$X-R-\overset{H}{N}-CSSR'$$

where X represents halogen, R represents saturated hydrocarbon, either aliphatic or alicyclic, and R' represents 2-chloroallyl. These compounds possess unusual biological activity being at the same time efficient pre-emergent herbicides and soil fungicides. The invention also contemplates other esters. In general, esters of the aforesaid acids possess useful fungicidal activity. For example R' may represent other halogen substituted lower alkenyl radicals, unsubstituted lower alkenyl, lower alkyl, halogen substituted lower alkyl, benzyl or halobenzyl. By alkenyl radicals are meant monoolefinic hydrocarbon radicals, i.e., unsaturated acyclic hydrocarbon radicals in which the unsaturation consists in one double bond. Any of the halogens appear suitable but the middle halogens bromine and chlorine are preferred. Typical examples of R' comprise allyl, 2-chloroallyl, 2-bromoallyl, benzyl, 2,5-dichlorobenzyl and 2,6-dichlorobenzyl.

Representative of the new compounds are cis- and trans-2,3-dichloro-2-butenyl bromopentyldithiocarbamate, cis- and trans-2,3-dichloroallyl chloropentyldithiocarbamate, 2,3-diiodo-2-butenyl bromobutyldithiocarbamate, 2-fluoro-3-chloroallyl chloropentyldithiocarbamate, 3,4,5-trifluoro-3-butenyl chloropentyldithiocarbamate, 2,3,3,-trichlroallyl chloropentyldithiocarbamate, 2,3 - dibromoallyl chloropentyldithiocarbamate, 4-chlorobutyl chloropentyldithiocarbamate, 2 - chloroallyl 5-chloropentyldithiocarbamate, 3-chloroallyl chlorobutyldithiocarbamate, allyl dichlorohexyldithiocarbamate, 2-bromoallyl chlorocyclopentyldithiocarbamate, allyl chloropentyldithiocarbamate, 2-chloroallyl chloropentyldithiocarbamate, 2-bromoallyl chloropentyldithiocarbamate, benzyl chloropentyldithiocarbamate, 2,6-dichlorobenzyl chloropentyldithiocarbamate, 2,5-dichlorobenzyl chloropentyldithiocarbamate, propyl chloropentyldithiocarbamate, ethyl chloropentyldithiocarbamate and butyl chloropentyldithiocarbamate.

The following examples illustrate in detail the preparation and properties of some of the new products but are not to be taken as limitative.

Example 1

Chloropentylamine hydrochloride was prepared by charging to a suitable reactor 324 grams (3.72 moles) of n-amylamine dissolved in 3000 cc. of carbon tetrachloride. While cooling in ice and water, dry hydrogen chloride was passed into this solution over a period of approximately 40 minutes until the exit gas was strongly acid and no further heat evolved. The suspension of n-amylamine hydrochloride in carbon tetrachloride was then heated to 60° C. and 700 grams of chlorine gas fed in evenly over a two hour period. During the chlorine addition the solution was irradiated with an ultraviolet sunlamp placed 8″ from the surface of the liquid. The bath temperature was maintained between 60–65° C. After addition was complete, the yellow solution was stirred for an hour and cooled to 5° C. The entire reaction mixture was treated with two 500 gram portions of water and the top water layers separated to give approximately a 50% solution of the chloropentylamine hydrochloride. The chlorine is on either the 4- or 5-carbon atom. It was found that dithiocarbamates would not form if the halogen was nearer to nitrogen than the 4-position.

To a stirred solution comprising 79.1 grams (0.25 mole) of the chloropentylamine hydrochloride thus prepared, 80 grams (0.5 mole) of 25% sodium hydroxide and 200 ml. of water was added dropwise at 5–15° C. 19 grams (0.25 mole) of carbon bisulfide. The mixture was stirred at 25–30° C. for one hour and 22.4 grams (0.2 mole) of 2,3-dichloro-1-propene then added. After stirring at 25–30° C. for 18 hours, the reaction mixture was extracted with 400 ml. of ethyl ether. The ether solution was washed with water until neutral to litmus, dried over sodium sulfate and the ether removed in vacuo at a maximum temperature of 80–90° C./1-2 mm. The yield of 2-chloroallyl chloropentyldithiocarbamate, a viscous amber oil, was 58.8%. Analysis gave 5.9% nitrogen as compared to 5.2% calculated for $C_9H_{15}Cl_2NS_2$.

Substituting an equimolar proportion of allyl chloride for the 2,3-dichloro-1-propene in Example 1, allyl chloropentyldithiocarbamate was obtained in 48.4% yield as a viscous amber oil.

The procedure is suitable for the preparation of other esters by replacing 2,3-dichloro-1-propene with other reactive chlorides. The following compounds, comprising viscous amber oils, further illustrate the invention:

| Product | Yield, percent | Analysis, percent | |
|---|---|---|---|
| | | Calcd. | Found |
| Cis- and trans-2,3-dichloroallyl chloropentyldithiocarbamate. | 65.1 | N------ 4.6<br>Cl------ 34.7 | 5.0<br>35.5 |
| 2,6-dichlorobenzyl chloropentyldithiocarbamate. | 79.5 | N------ 3.9 | 3.8 |
| 2,5-dichlorobenzyl chloropentyldithiocarbamate. | 85.5 | N------ 3.9 | 4.4 |

The new compounds may be applied to the soil conveniently in the form of a spray containing the active ingredient. The active components are insoluble in water but soluble in common oragnic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecylbenzenesulfonate, or an amine salt of dodecylbenzenesulfonic acid, alkali metal salts of sulfated fatty alcohols, ethylene oxide condensation products of alkyl phenols or tall oil and other dispersing and wetting agents. The toxicants may be formulated and applied as dry compositions by mixing them with a finely divided or granular solid carrier, as for example talc, clay, pyrophyllite, silica and fuller's earth. Alternatively, the dry composition may be dispersed in water and applied as a spray. For use as herbicides an amount within the range of 1 to 60 pounds per acre is suitable. An amount within the range of 10 to 500 pounds per acre encompasses the range suitable for practical control of soil fungi in most cases.

As illustrative of herbicidal activity, 2-chloroallyl chloropentyldithiocarbamate was emulsified in water and the emulsion applied as a spray. In this manner, the active ingredient at a dosage of 5 pounds per acre was applied to the ground of seeded plots before the grass or other plants emerged. Severe phytotoxicity was observed to wild oats, brome grass, rye grass, crab grass, pigweed and sorghum.

Destruction of fungi present in soil was demonstrated by treating soil with the test material, incubating for 24 hours and sowing seeds in the incubated soil. Disease incidence was assessed after 10–14 days. A stock solution of the test material was pipetted into a glass jar containing one pound of infested soil. A concentration of 100 parts per million parts of soil corresponds to a dosage of 200 pounds per acre. The "damping-off" fungi present were principally Pythium, Rhizoetonia and Fusarium species. The jar was sealed and the contents thoroughly mixed by vigorous shaking. The treated soil was incubated at room temperature for 24 hours, transferred to clay pots and 15 seeds of each of 2 crop plants sown in each pot. The crop plants were Delta Pine cotton and Straight Eight cucumber. The seeded pots were then incubated at 70° F. at 98% humidity to insure activity of the organism in the soil. 24 hours later the pots were removed to a greenhouse and disease assessments made within 10–14 days. The percent emergence and disease incidence were recorded. Control samples were included which comprised inoculated, untreated soil and uninoculated, sterile soil. For convenience in recording the data, the following rating scale was used.

| Rating: | Healthy plants out of 30 |
|---|---|
| E | 26–30 |
| P | 19–25 |
| F | 13–18 |
| N, not effective | <13 |

The results are recorded below:

| | Soil fungicide rating at 200 lbs./acre |
|---|---|
| 2-chloroallyl chloropentyldithiocarbamate | P |
| 2,6-dichlorobenzyl chloropentyldithiocarbamate | F |
| 2,5-dichlorobenzyl chloropentyldithiocarbamate | F |

Similar tests with the corresponding zinc, cadmium and copper salts of chloropentyl dithiocarbamic acid gave an N rating at a dosage of 200 pounds per acre.

It is intended to cover all changes and modifications of the examples of the invention herein chosen for purposes of disclosure which do not constitute departures from the spirit and scope of the invention.

What is claimed is:

1. The method which comprises applying to soil a concentration toxic to fungi and germinating seedlings of a compound of the structure

where X represents halogen, R represents a member of the group consisting of alkylene and alicyclic of at least four but more than six carbon atoms and R' represents a member of the group consisting of lower alkenyl halogen substituted lower alkenyl, lower alkyl, halogen substituted lower alkyl, benzyl and halogen substituted benzyl.

2. The method of controlling vegetation which comprises applying to the soil medium a toxic concentration of a phytotoxic compound of the structure

where R represents haloalkyl of at least four but not more than six carbon atoms in which the halogen is at least four carbon atoms removed from the nitrogen and R' represents 2-halogen substituted lower 2-alkenyl.

3. The method of controlling vegetation which comprises applying to the soil medium a toxic concentration of 2-chloroallyl chloropentyldithiocarbamate.

4. A method of destroying soil fungi which comprises treating the organism in its environment with a toxic concentration of a compound of the structure

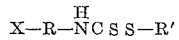

where X represents middle halogen, R represents alkylene of at least 4 but not more than 6 carbon atoms and R' represents 2-chloroallyl.

5. A method of destroying soil fungi which comprises treating the organism in its environment with a toxic concentration of a compound of the structure

where R represents haloalkyl of at least four but not more than six carbon atoms in which halogen is at least four carbon atoms removed from the nitrogen and R' represents halogen substituted benzyl.

References Cited by the Examiner
UNITED STATES PATENTS

| 2,919,182 | 12/1957 | Harman et al. | 71—2.7 X |
| 2,941,879 | 6/1960 | Goodhue | 71—2.7 |

LEWIS GOTTS, *Primary Examiner.*